(12) United States Patent
Tulin

(10) Patent No.: US 8,806,765 B2
(45) Date of Patent: *Aug. 19, 2014

(54) SHAPED FIT SIZING SYSTEM

(71) Applicant: Levi Strauss & Co., San Francisco, CA (US)

(72) Inventor: Kris Tulin, El Cerrito, CA (US)

(73) Assignee: Levi Strauss & Co., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,987

(22) Filed: Nov. 13, 2012

(65) Prior Publication Data

US 2013/0312273 A1    Nov. 28, 2013

Related U.S. Application Data

(63) Continuation of application No. 12/917,887, filed on Nov. 2, 2010, now Pat. No. 8,307,560.

(60) Provisional application No. 61/391,579, filed on Oct. 8, 2010.

(51) Int. Cl.
*A41H 3/00* (2006.01)
*A41H 1/02* (2006.01)
*G01B 3/02* (2006.01)

(52) U.S. Cl.
USPC .................................. 33/17 R; 33/11; 33/512

(58) Field of Classification Search
USPC ....... 33/17 R, 11, 512, 2 R, 17 A, 1 BB, 755, 33/759
See application file for complete search history.

(56) References Cited

U.S. PATENT DOCUMENTS 167,957 A   9/1875  Ullrich
519,090 A   5/1894  Newcomb
655,960 A   8/1900  Cunningham (Continued)

FOREIGN PATENT DOCUMENTS

WO    0235952      5/2002
WO    2006131156   12/2006
WO    2008113367   9/2008
WO    2009124545   10/2009

OTHER PUBLICATIONS

K. Hutchins, "Product Review: Lane Bryant's New Right Fit Jeans," available at <http:associated content.com/article/352284/product_review_lane_bryants_new_right.html?cat=46>, published Aug. 27, 2007, retrieved Nov. 2, 2010, 1 page.

(Continued)

*Primary Examiner* — Christopher Fulton
(74) *Attorney, Agent, or Firm* — Aka Chan LLP

(57) ABSTRACT

A revolutionary, new sizing and fitting system for jeans is based on the concept of shape, not size. This sizing and fitting system is organized around some basic body shapes categories: e.g., slight curve (straighter figure, flatter fanny), demi curve (evenly proportioned hip and seat) and bold curve (smaller waist, larger seat). To use the system, the consumer finds their shape using a shape measuring tool. The shape measuring tool calculates a shape category based on a differential of two measurements in the seat area. With this shape category information, the consumer can easily locate a pair of form-fitting jeans. The sizing and fitting system is also applicable to pants, shorts, skirts, and other clothing where form fit is desirable in the seat and hip area.

27 Claims, 12 Drawing Sheets

(56) References Cited

U.S. PATENT DOCUMENTS

| | | |
|---|---|---|
| 736,052 A | 8/1903 | Adamson |
| 900,568 A | 10/1908 | Miles |
| 942,338 A | 12/1909 | Morrison |
| 988,683 A | 4/1911 | Wurtzel |
| 1,096,975 A | 5/1914 | Watters |
| 1,248,035 A | 11/1917 | Taylor |
| 1,278,107 A | 9/1918 | Cherrie et al. |
| 1,292,056 A | 7/1919 | Remy |
| 1,521,054 A | 12/1924 | Sniegocki |
| 1,784,888 A | 12/1930 | Couture |
| 3,685,155 A | 8/1972 | Oblander |
| 4,114,277 A | 9/1978 | Chalker |
| 4,224,740 A | 9/1980 | Gibson |
| 4,558,420 A | 12/1985 | Gerber |
| 4,823,476 A | 4/1989 | Curtin |
| 4,916,634 A | 4/1990 | Collins |
| 5,031,326 A | 7/1991 | Huang |
| 5,163,007 A | 11/1992 | Slilaty |
| 5,619,804 A | 4/1997 | Vogt |
| 5,680,314 A | 10/1997 | Patterson |
| 5,768,135 A | 6/1998 | Park |
| 6,415,199 B1 | 7/2002 | Liebermann |
| 6,546,309 B1 | 4/2003 | Gazzuolo |
| 6,640,460 B1 | 11/2003 | Nabarro |
| 6,931,747 B2 | 8/2005 | Rego |
| 6,968,075 B1 | 11/2005 | Chang |
| 6,978,549 B2 | 12/2005 | Ellis |
| 7,310,883 B1 | 12/2007 | Park |
| 7,685,727 B2 | 3/2010 | Sieber |
| 8,307,560 B2 * | 11/2012 | Tulin .............................. 33/17 R |
| 2002/0004763 A1 | 1/2002 | Lam |
| 2002/0138170 A1 | 9/2002 | Onyshkevych |
| 2002/0178061 A1 | 11/2002 | Lam |
| 2009/0234489 A1 | 9/2009 | Healy |
| 2011/0083331 A1 | 4/2011 | Hopman |

OTHER PUBLICATIONS

"Lane Bryant Relaunches Right Fit Premium Denim and Kicks Off Two Exciting Sweepstakes on Facebook and in Stores," The Street, Press Release, Aug. 11, 2010, available at <http://www.thestreet.com/print/story/10833714.html>, retrieved Nov. 2, 2010, 2 pgs.

"The Return of Right Fit," available at <http://www.lanebryant.com>, retrieved Nov. 2, 2010, 1 pg. (for PTO exam purposes, use publication date of Aug. 11, 2010).

"No Two Plus-Size Bodies are Alike; Lane Bryant Starts Revolution in Sizing Technology Where All Plus-Size Women Get a Customized Fit," Hispanic PR Wire, Sep. 5, 2007, available at <http://www.hispanicbusiness.com/news/2007/9/6/no_two_plussize_bodies_are_alike.htm>, retrieved Nov. 2, 2010, 1 pg.

"Right Fit by Lane Bryant," Internet Archive, Way Back Machine, search result for Web address www.lanebryant.com, pages archived Nov. 11, 2007, available at <http://web.archive.org/web/*/http://www.lanebryant.com>, retrieved Nov. 2, 2010, 5 pgs.

* cited by examiner

Demi Curve
3 1/2" – 5" Differential
(Low Hip/Seat to High Hip)

Evenly Proportioned

Demi Curve
3 1/2" – 5" Differential
(Low Hip/Seat to High Hip)

Evenly Proportioned

Bold Curve
*5" – 6 ½" Differential*
*(Low Hip/Seat to High Hip)*

Hourglass

Bold Curve
*5 – 6 ½" Differential*
*(Low Hip/Seat to High Hip)*

Hourglass

Full Seat

Full Seat

SHAPED FIT SIZING SYSTEM

CROSS-REFERENCE TO RELATED APPLICATIONS

This patent application is a continuation of U.S. patent application Ser. No. 12/917,887, filed Nov. 2, 2010, issued as U.S. Pat. No. 8,307,560 on Nov. 13, 2012, which claims the benefit of U.S. provisional application 61/391,579, filed Oct. 8, 2010, which is incorporated by reference along with all other references cited in this application.

BACKGROUND OF THE INVENTION

The present invention relates to clothing sizing systems and, more specifically, to pants, especially jeans, having shaped fit sizing.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co.

Though jeans at the time of the Gold Rush were used as work clothes (which were relatively loose fitting since fashion was not a concern), jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people want their jeans to have a customized fit (e.g., "tight fitting jeans"). Good fitting jeans today have a form fit that is very different than, for example, the pants of the 1800s and early 1900s. Before, loose-fit or overly baggy pants and balloon dresses were the norm, since they were intended to hide or obscure the body shape. Today, modern technology has allowed the manufacture of off-the-rack pants, jeans, and shorts having much better form fit, while at the same time being comfortable to wear.

Despite the widespread success jeans have enjoyed, there is a continuing desire to address the demands of the consumer even better. Consumers desire off-the-rack, form-fitting jeans for their own seat and hip shapes, without having to pay for custom tailoring. Existing jeans sizing systems, which may have addressed the market demand of the time they were developed, do not adequately address the demand of the modern consumer and their wide variety of body shapes.

Therefore, there is a need for a new fitting system for jeans and similar clothing (e.g., pants, shorts, and skirts) so that a consumer can more easily find the form-fitting jeans for their shape. This new system gives the consumer the custom-tailored fit they desire in an off-the-rack jean.

BRIEF SUMMARY OF THE INVENTION

A new sizing and fitting system for jeans is based on the concept of shape, not size. This sizing and fitting system is organized around some basic body shape categories: e.g., slight curve (straighter figure, flatter fanny), demi curve (evenly proportioned hip and seat) and bold curve (smaller waist, larger seat). To use the system, the consumer finds their shape using a shape measuring tool. The shape measuring tool calculates a shape category based on a differential of two measurements in the seat area. With this shape category information, the consumer can easily locate a pair of form-fitting jeans. No need to try on multiple pairs of jeans in a dressing room. The fitting system is also applicable to pants, shorts, skirts, and other clothing where form fit is desirable in the seat and hip area.

A specific implementation of the sizing and fitting system of the invention is Levi's Curve ID® system. Curve ID is a registered trademark of Levi Strauss & Co. Curve ID allows women to find the perfect fit based on body type. Curve ID specifically addresses women's body shapes with its slight, demi, and bold curve categories. This new fitting system formula for finding the perfect fit looks beyond waist size to address the true curves of a woman's body. For example, although two women may have the same waist measurement, differences in overall proportions may mean that each woman has a different three-dimensional shape or curve.

Curve ID includes three custom fits based on the difference between the measurement of a woman's hip and seat—the greater the difference, the more curvy the body. The slight curve fit is for relatively straight figures. The fit defines a woman's waist, while accentuating her curves. The demi curve fit is for evenly proportioned women. This fit is designed to flatter a woman's waist while smoothing her shape. The bold curve fit is for curvy women. The bold curve fit hugs the woman's waist without gaping or pulling. Optionally, Curve ID includes a fourth custom fit, which is called the supreme curve.

These custom fits and new approaches to measuring a woman's body were created after listening to women from around the world and are based on a study of body scans of more than 60,000 women. From the studies, three distinct body types were identified that account for 80 percent of women's shapes. The customized fits and measurement techniques are based on these body types. These new fits allow women of many different body types to find their perfect fit and ultimately help them feel confident and attractive in their jeans.

Although Curve ID specifically addresses off-the-rack customized fit for women, aspects of the system can be applied to other classes of consumers, including men, children, teens, boys, and girls.

Each category or classification is based on a distinct body shape that is determined by a body measurement differential. As an example, for a person to be fitted, circumference or girth measurements may be taken at a (1) high hip location and (2) low hip (seat) positions. A difference between these two measurements is the body measurement differential, which is an index used to determine which body shape fit category the person is in.

In an implementation, a system includes: a first sizing classification for pants, corresponding to a first differential between first and second body measurements in a first range; a second sizing classification for pants, corresponding to a second differential between first and second body measurements in a second range; and a third sizing classification for pants, corresponding to a third differential between first and second body measurements in a third range, where the first body measurement includes a person's girth at a first distance below a natural waist of the person, and the second body measurement comprises the person's girth at a second distance below the natural waist of the person.

In an implementation, a method of fitting jeans having shaped fit sizing includes: providing a shape measuring tool;

and providing at least a first predetermined shaped fit sizing category for jeans, a second predetermined shaped fit sizing category for jeans, and a third predetermined shaped fit sizing category for jeans. With the shape measuring tool, at least two girth measurements of a person's body are made in at least two different positions below a waist of that person. Based on the at least two girth measurements, at least one the first predetermined sizing category, second predetermined sizing category, or third predetermined sizing category is identified as corresponding to the at least two girth measurements. Each of the first predetermined shaped fit sizing category, second predetermined shaped fit sizing category, and third predetermined shaped fit sizing category exists before the at least two girth measurements are made.

In an implementation, a system for fitting jeans includes: a first predetermined shaped sizing category for jeans; a second predetermined shaped sizing category for jeans; a third predetermined shaped sizing category for jeans; a measurement guide for the first, second, and third predetermined shaped sizing category, where the measurement guide indicates a first girth measurement being taken at a first position below a person's waist, and a second girth measurement being taken at a second position below the person's waist; and a shape index chart for the first, second, and third predetermined shaped sizing category for jeans, where the shape index chart indicates the first and second girth measurements corresponding to the first predetermined shaped sizing category, second predetermined shaped sizing category, or third predetermined shaped sizing category, where each of the first predetermined shaped sizing category, second predetermined shaped sizing category, and third predetermined shaped sizing category exists before the first and second girth measurements are made.

In an implementation, a system includes: a first sizing classification for pants, corresponding to fit for a first differential value between first and second body measurements in a first range; a second sizing classification for pants, corresponding to fit for a second differential value between first and second body measurements in a second range; and a third sizing classification for pants, corresponding to fit for a third differential value between first and second body measurements in a third range.

A first pants of a given size in the first sizing classification has a first girth measurement at a first position at a first distance below a top of the pants. A second pants of the given size in the second sizing classification has a second girth measurement at the first position at the first distance below the top of the pants. A third pants of the given size in the third sizing classification has a third girth measurement at the first position at the first distance below the top of the pants. For the system, the first, second, and third girth measurements of the pants is about the same.

The first pants of the given size in the first sizing classification has a fourth girth measurement at a second position at a second distance below the top of the pants. The second distance is less than the first distance. The third pants of the given size in the third sizing classification has a fifth girth measurement at the second position at the second distance below the top of the pants. For the system, the fourth girth measurement is greater than the fifth girth measurement.

The system of the invention is for jeans for a single manufacturer or jeans of the same brand. The single manufacturer or brand will have jeans in different shaped sizing classifications (e.g., A, B, and C), so the consumer will be able to find their fit from this manufacturer. With the sizing and fitting system of the invention, the consumer will be able to more easily find the perfect fitting pair of jeans, without needing to try on multiple pairs of jeans.

Other objects, features, and advantages of the present invention will become apparent upon consideration of the following detailed description and the accompanying drawings, in which like reference designations represent like features throughout the figures.

DETAILED DESCRIPTION OF THE INVENTION

Many people have difficulty finding off-the-rack pants, jeans and shorts, that fit well and are flattering. A problem with previous off-the-rack pants and jeans is that sizing is based on a waist number (e.g., 29 inches) and inseam number (e.g., 30 inches), or simply a single jeans size number (e.g., size 7). Even if size numbers are correct, the pants do not necessarily fit because people have different body proportions, curves, and shapes. Most people recognize this. So, to find the proper fitting jeans, people usually pull a number of pants off the rack to try them. The previous sizing systems for pants and jeans inherently do not take into consideration shape.

A global survey reports that more than half of women (54 percent) try on at least 10 pairs of jeans to find one pair they would buy. Most women (87 percent) wish they could find jeans that fit better than the ones they own. Most women (67 percent) believe that jeans are designed for women with "ideal" figures. Very few women (28 percent) believe that jeans are designed to fit their bodies.

Figure 1:
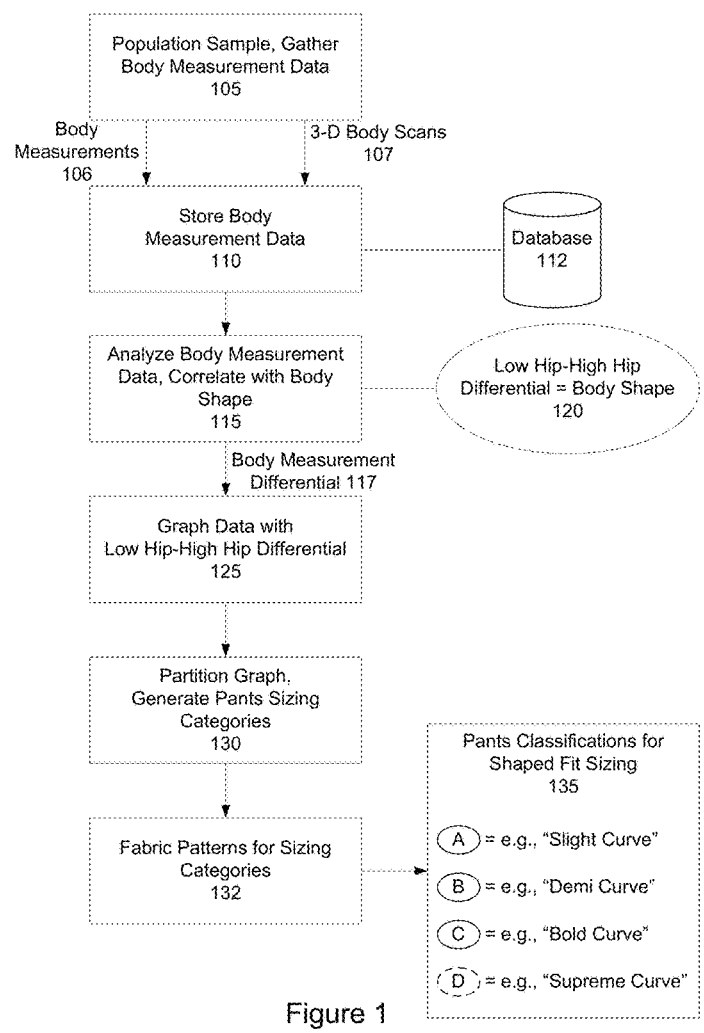
FIG. 1 shows a system of shaped fit sizing for pants. These pants include fashion jeans and shorts.
Figure 2:
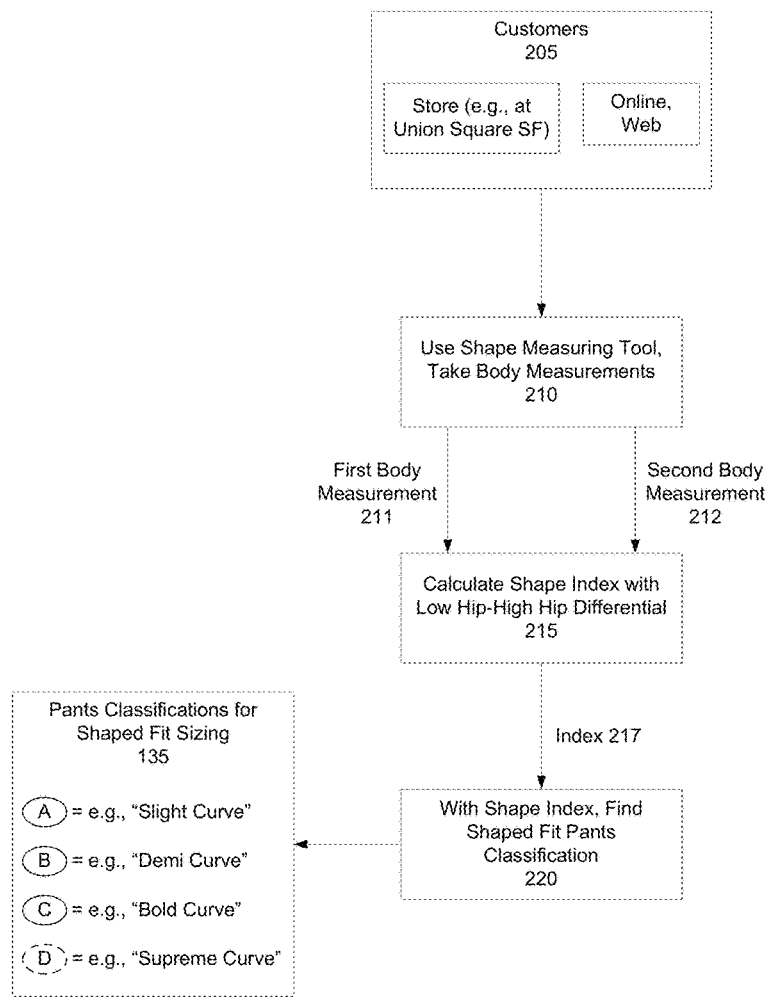
FIG. 2 shows a system for fitting a person to pants having shaped fit sizing.

To address the shortcomings of the previous sizing methodologies, this patent introduces a new shaped sizing system for pants. FIG. 1 shows a block diagram of a new system of shaped fit sizing for pants. FIG. 2 is a block diagram of a system for fitting a person to pants having shaped fit sizing.

Although the system is discussed with respect to pants, jeans, and shorts, the system can also be applied to other types of shaped fit clothing, especially those worn, at least in part, at and below the waist. These include dresses, skirts, slacks, formal wear (e.g., tuxedo trousers), school uniforms, military wear, athletic wear, sportswear (e.g., cycling wear, ski wear, golf wear, martial arts wear, track and field wear, swim wear, gymnastics wear, softball uniforms, baseball uniforms, football uniforms, hockey uniforms, lacrosse uniforms, winter and summer Olympics team apparel, gym wear, and others), dance wear, lingerie, panties, boxers, briefs, corsets, costumes (e.g., Halloween costumes or masquerade ball), and many others.

FIG. 1 shows a system of shaped fit sizing for pants. A shaped fit sizing system is targeted to specific consumers. For example, a specific target market for shaped fit is the U.S. women's market. Other markets may be in other geographic areas, such as Asia and Russia. The shaped fit sizing system can be tailored to specific markets and populations. This will ensure the shaped fit sizing system will have sizings to accommodate the great majority of the consumers and body types in those markets.

The system in FIG. 1 can achieve shaped fit sizing for pants for a targeted population. The system has components to generate metrics upon which to classify pants having shaped fit sizes. Components include: selecting a population sample and collecting body measurement data for this sample 105. The collected body measurement data can include body measurements 106 and digital body scans 107. This measurement data 110 can be stored in, for example, a database 112, for subsequent analysis and correlation 115. This analysis determines a body measurement differential 117 upon which body shape can be based. In a specific implementation, the selected differential is a low hip to high hip differential 120. The differential data is graphed 125 and partitioned 130, which forms the pants sizing categories or classifications 130. Based on the determined sizing categories, fabric patterns 132 are created. The fabric patterns are used to manufacture pants with the shaped fit sizing 135.

In a specific implementation, there are three sizing categories 135, which are identified as shaped fit sizings A, B, and C. The sizings can be referred to by other names. For example, for Curve ID, the names are slight, demi, and bold. Or the shaped fit sizings may be referred to using different colors.

In another specific implementation, there is an additional shaped fit sizing D. For Curve D, this sizing name is supreme. Shaped fit sizing D is optional and may not be available in every target market. Depending on the demographics of a target population, this additional shaped sizing can ensure that greater numbers (e.g., a greater percentage) of consumers will fit the into the available shaped sizings. For example, in one marketplace, there may be people who do not fit size C, so they will need to buy size D clothes. However, in a different marketplace, there may not be any (or many) people who will fit size D, so size D clothes are not needed or sold there.

Target populations are typically divided geographically because clothing is usually sold on a geographical basis. So, there is a population of people where it is desirable to obtain shaped fit sizing for pants. Additionally, as desired to target the market and consumer better for better fit, this population may be divided by age, sex, ethnicity, or other parameters, or combinations of these.

For example, the population can be divided into geographic areas such as United States, Asia, and Russia. The population can include only females, girls and women. In other implementations, the population can include only males, boys and men. Generally, men and women have different shapes so they are considered in separate population studies. Alternatively, the population may include the entire world, and the population divided up subsequently after some analysis by the system. Based on how the population is divided or organized, separate or independent sizing systems can be developed for the respective population (e.g., girls and women, men and women, and women in the U.S. and women in China).

The actual population size of an entire market is enormously large. For example, for females in the United States, the population size is roughly 150 million; in Europe, roughly 450 million; and in China, roughly 500 million. It is impractical to make measurements of every individual in the population.

So instead, a sample (105) of the population is taken to reduce a number of measurements needed. Accurate results are desirable so the population sample should be sufficiently large to give good results which represent the entire population. In a specific implementation, for Curve ID, the population sample included over 60,000 women around the world.

Making measurements on the sample population sample can include setting up digital scanning booths at various locations (e.g., shopping mall and airports) and scanning the bodies of the individuals and storing 110 each scan 107 with measurements, along with other pertinent information, in a database 112 (such as stored on a computer hard disk). Data can also be collected by recording manual measurements 106 and saving these into database 112. However, a digital scan of the body yields more information because a three-dimensional surface of the body will be recorded, not just some measurements at various points of the body (e.g., girth of waist).

With a body scan, any specific desired measurements can be made for that body scan (as if the person were actually present to take measurements). For example, not only will the girth of waist be available, the girth of waist at an offset 4 inches below the waist can be measured. Without the body scan, if the waist measurement were made manually, but the offset measurement was not made manually, then the offset measurement would not be available. The offset measurement might be estimated through a calculation, but this would generally not be as accurate as a measurement from the body scan.

In a specific implementation, the body measurement data included over 60,000 digital body scans of women. It should be appreciated that the number of body scans in a sample can vary. Generally, a larger sample size leads to increased precision in estimates of various properties of the population. In this specific implementation, the population sample included female subjects from the U.S., China, Japan, France, Germany, and Russia. The age of the subjects ranged from about 15-44 years old. In another specific implementation, the age of the subjects ranged from about 15-34 years old.

The body measurements are taken from randomly or quasi-randomly selected people in the target population. The subjects are randomly selected based on the demographic area and age groups that are targeted. In a specific implementation, the sample subjects included women from the U.S., China, Japan, France, Germany, and Russia in the 15-24 years old age bracket and the 25-34 years old age bracket. In another specific implementation, the sample further included women in the 35-44 years old age bracket for each of the countries.

In a specific implementation, the collected measurements 110 include age, height, weight, and body dimensions such as girth measurements at specific points or locations on the body. Some or all the body scans may be collected by a third party. In a specific implementation, body scan collection centers have three-dimensional (3D) scanning equipment.

A three-dimensional scanner is a device that analyzes a real-world object (e.g., person or human being) to collect data on its shape. The collected data can then be used to construct digital, three-dimensional models. The three-dimensional scanner allows three-dimensional scans to be made based on the collected body measurement data.

These raw data measurements were stored in a database. The database can be read, accessed, analyzed, and processed by a computer system, which is hardware and software for processing and storing data. Some examples of computer system hardware include computer processors (e.g., multi-core processors), computer-readable medium, memory or nonvolatile memory on which the measurement data and software programs are stored. The nonvolatile memory may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

Figure 3:
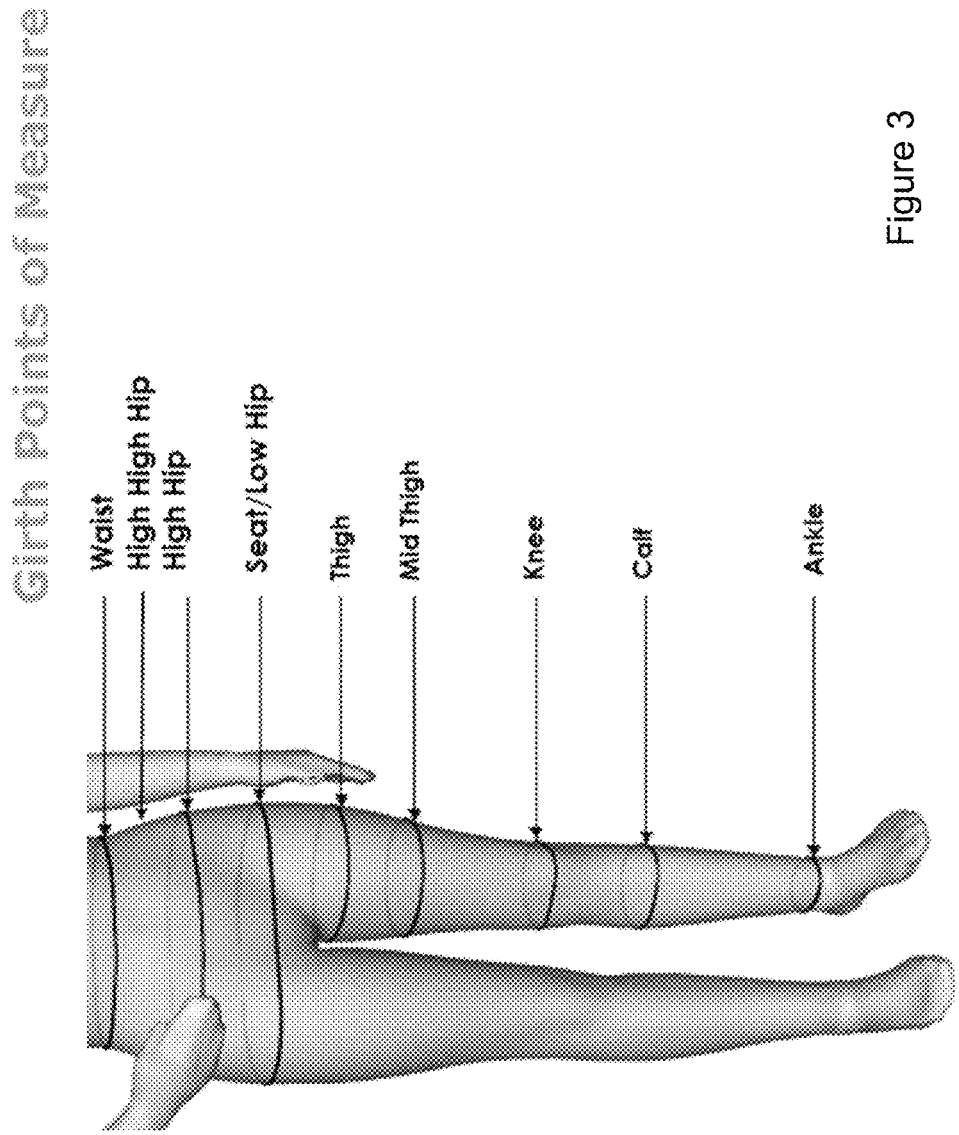
FIG. 3 shows various points on a person, below a waist point, at which girth can be measured.

FIG. 3 shows various points on a person, below a waist point, at which girth can be measured. The points include a natural waist, hi-high hip, high hip, seat (or low hip), thigh, mid thigh, knee, calf, and ankle Any or all these measurements may be included in the body scan data.

Natural waist refers to the location at which the body, and specifically the torso, bends. So, when a person bends sideways, the point of the bend on the torso is the natural waist. This is a reference point from which measurements are made. By using the same reference point on different people, this allows a consistent measurements from person to person, regardless of what each person considers their waist (which can vary from person to person).

Figure 4:
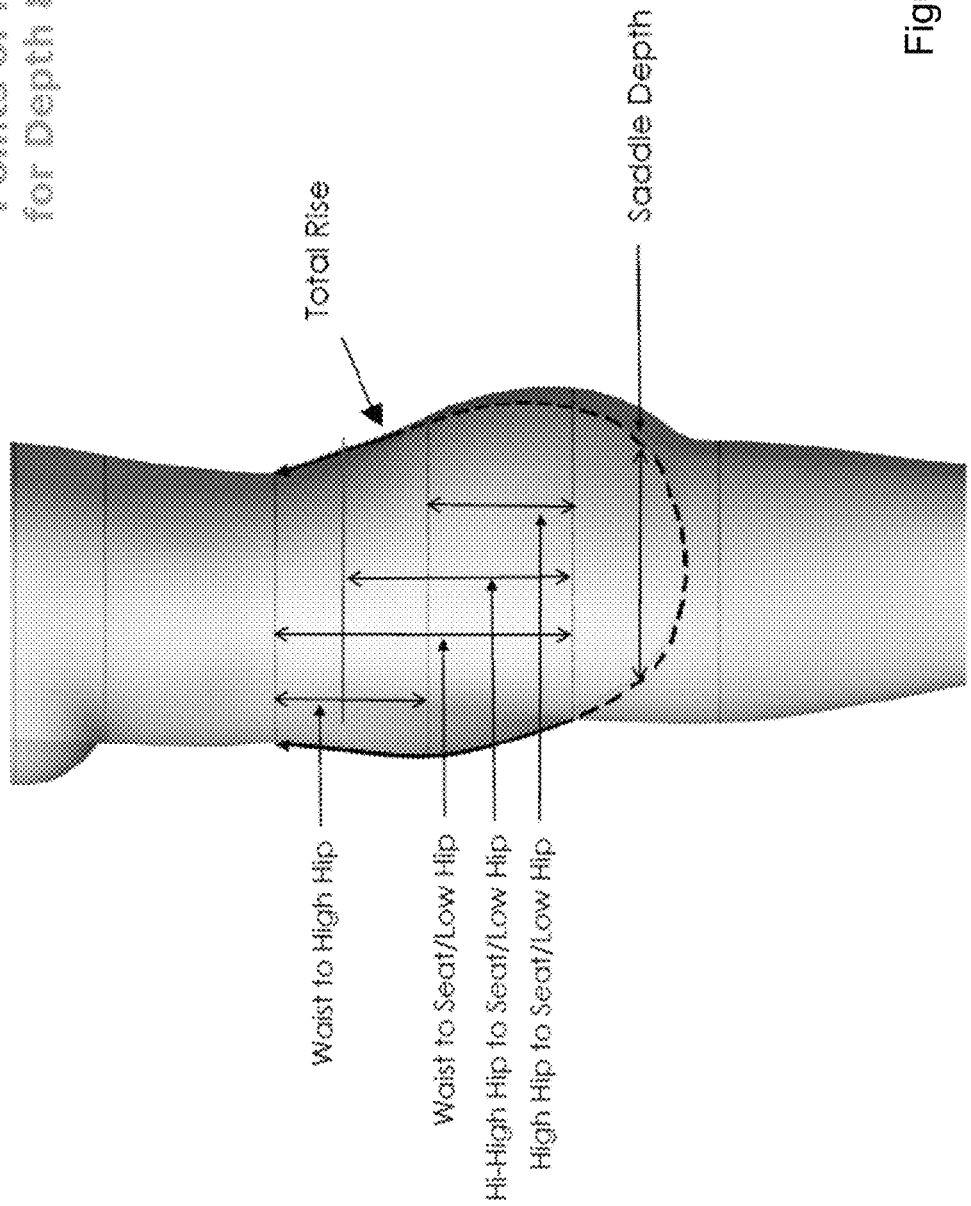
FIG. 4 shows some points at which differential girth body measurements can be measured on a person. These differential girth body measurements can be used as an indication of depth and shape of a person.

FIG. 4 shows some points at which differential girth body measurements can be measured on a person. These differential girth body measurements can be used as an indication of width, depth, and shape of a person. These differentials include the natural waist to high hip, natural waist to seat (or low hip), hi-high hip to seat, and high hip to seat. A differential is a difference between two lower body parameters. Other measurements include total rise and saddle depth. Any or all these differential measurements may be included in the body scan data, or calculated from the body scan data.

The differentials in FIG. 4 are in reference to the natural waist described above. The high hip is located about 4 inches (or about 10.2 centimeters) below the natural waist. The seat or low hip is typically located about 4 inches below the high hip or about 8 inches (or about 20.3 centimeters) below the natural waist.

Returning to FIG. 1, the collected body measurement data is analyzed 115 to determine which of the numerous measurements taken and available correspond to body shape, and can be used as a basis for shaped fit sizing pants. FIG. 3 shows nine girth measurement points, and FIG. 4 shows four differential body measurements. There are many combinations of measurements to consider. These and other measurement points (not indicated) were considered.

The analysis, including statistical and mathematical calculations, found the low hip (or seat) to high hip differential correlates highly with body shape. The other differentials listed in FIG. 4 also correlate to body shape, but the low hip-high hip differential was selected. In alternative implementations, the shaped fit sizing system can use any of the other differentials—natural waist to high hip, natural waist to low hip, or hi-high hip to low hip.

To analyze the data and generate the charts, the components or subcomponents of the analysis and correlation component can include and be performed by a computer system. The computer system can include, for example, a computer screen to electronically display the graphs and charts. The computer system can include software programs stored in computer memory for performing (via a computer processor) the statistical analyses.

In a specific implementation, the result or output of analysis 115 is the identification of low hip-high hip differential 120 as indicative of body shape or body geometry. The low hip-high hip differential is used in Curve ID, where low hip is measured 8 inches from the natural waist and high hip is measured 4 inches from the natural waist. The differential may also be referred to as a shape index. Other names can be used.

For Curve ID, a difference between the high hip and low hip measurement is about 4 inches (i.e., 8 inches minus 4 inches). For shaped fit sizing system, the difference between the two body measurement points can vary. However, better accuracy and fit can be obtained when the body point differences is greater than about 3 inches. The body point differences can even be greater than the 4 inches used for Curve ID. Generally, smaller differences such as 0.5 inches or 1 inches of difference in the body points may not give as accurate a measure of body shape.

The selected body measurement differential 117 for the target population is analyzed 125. The analysis can include graphing the differential amounts for the target population to see a distribution of body shape.

Figure 5:
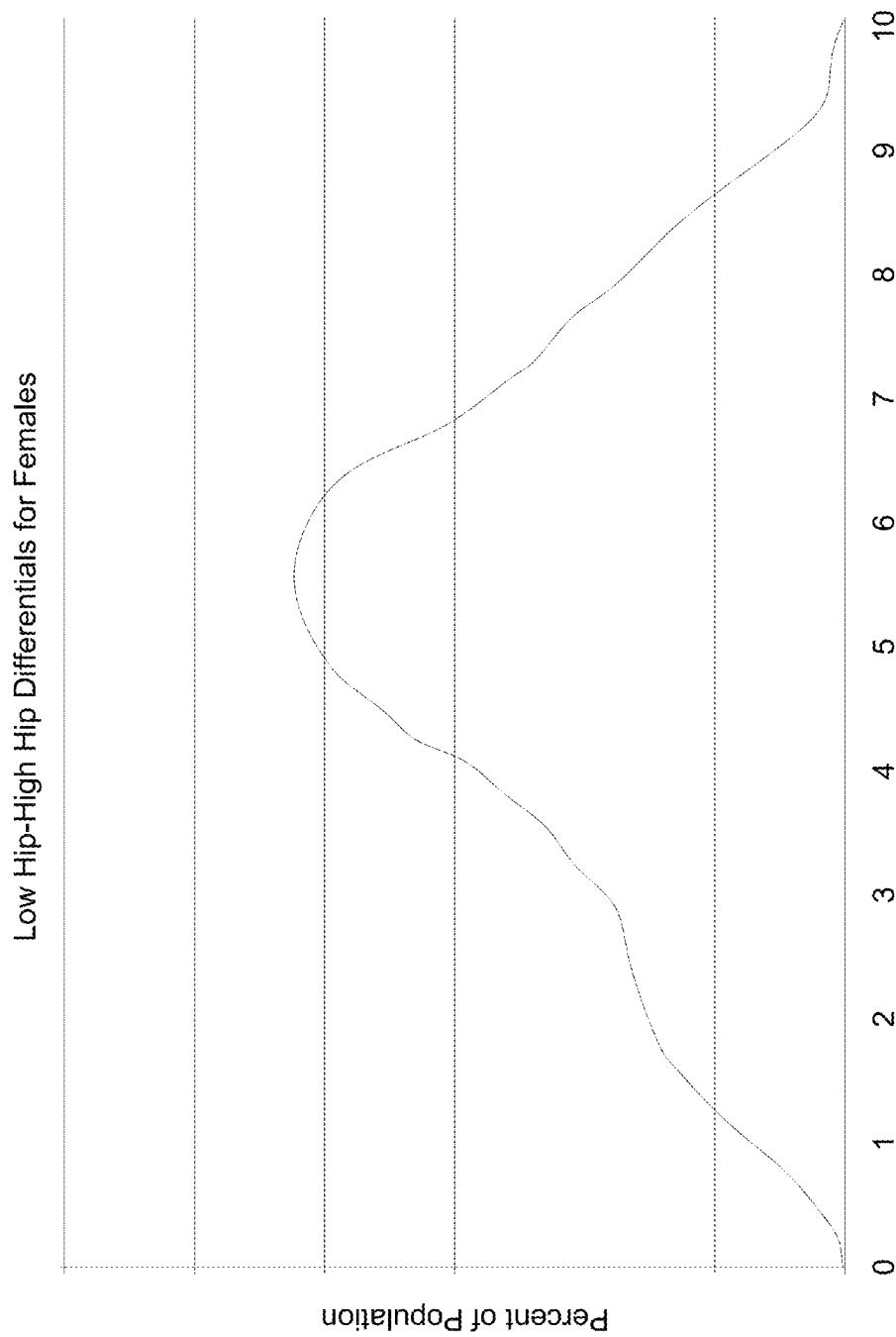
FIG. 5 shows an example of a distribution curve of low hip to high hip differentials for a population of people.

FIG. 5 shows a sample graph for body measurement differential (i.e., low hip-high hip differential) distribution for women. The x-axis shows the differential amount. The y-axis represents the percentage of population having a particular differential amount. The differential amounts ranges from 0 to 10 inches of differential.

FIG. 5 shows an example of the analysis to generate shaped fit pants. Further analysis can include raw body measurement charts, graded body measurement charts, measurement distribution graphs, comparative distribution graphs (e.g., comparing different age groups, different countries, different regions, different lifestyle groups, or combinations of these). The analysis can include statistical analyses and calculations of the data.

This distribution curve graph may be displayed on a screen of a computer system, printed on paper using a printer, or both. FIG. 5 shows a specific example of a graphical representation and the data can be represented using other types of graphs such as a histogram or pie chart. A histogram is a representation of a frequency distribution using rectangles whose widths represent class intervals and whose areas are proportional to the corresponding frequencies.

Additionally, the distribution curve as shown in FIG. 5 may be calculated using any demographic or combination of demographics of the human population. For example, depending upon the target market, a distribution curve may be calculated based on demographics such as gender (e.g., male and female), age bracket (e.g., 15-24 year olds and 25-34 year olds), geographic region (e.g., U.S., China, Japan, France, Germany, or Russia), or combinations of these.

Graph data 125 is analyzed and partitioned 130 to generate a shaped fit sizing system for pants 135. Fabric patterns are created that correspond to the shaped fit categories 132. The pants are manufactured according to these fabric patterns.

An implementation has three shaped fit categories, each spanning 1.5 inches of differential. A first differential range (shaped fit size A or slight) is from about 2 inches to about 3.5 inches (about 5.1 centimeters to about 8.9 centimeters). A second differential range (shaped fit size B or demi) is from about 3.5 inches to about 5 inches (about 8.9 centimeters to about 12.7 centimeters). A third differential range (shaped fit size C or bold) is from about 5 inches to about 6.5 inches (about 12.7 centimeters to about 16.5 centimeters).

Based on graph 125, this system of shaped fit categories with 1.5-inch ranges covers about 80 percent of the target population. However, it may be desirable to increase coverage. Therefore, an alternate implementation includes a fourth shape fit category. This fourth differential range (shaped fit size D or supreme) is from about 6.5 inches to about 8 inches (about 16.5 centimeters to about 20.3 centimeters). With this additional shaped fit, the coverage of the system is over 80 percent of the target population.

The curve may be partitioned or segmented into any number of differential ranges (e.g., more or fewer than three, two, five, six, or seven). Generally, the greater the number of partitions or ranges the more likely it is that a person will be able to find a pair of pants that fits the person's shape more closely.

For example, the three shaped fit sizes described spans from 2 inches to about 6.5 inches, which is 4.5 inches of differential total. This range can be split into five shaped fit categories, each covering a 0.9 inches range (for symmetrically or identically sized ranges). However, this leads to having two additional shaped sizing categories, which compared to three sizing categories, complicates manufacturing and generally increases costs. Each additional sizing category can increase the cost to make the pants because for each garment waist size there is an additional shape fit size.

Thus, it will be desirable to identify and select groups of ranges that are most common and represent the desired coverage of the target market. In a specific implementation, there are at most three sizing classifications or three sets of differential ranges to achieve the desired coverage. In another specific implementation, there are at most four sizing classifications to achieve the desired coverage.

Although symmetrically or identically sized differential ranges have been described, a shaped fit sizing system of the invention can include asymmetrically or differently sized differential ranges. For example, the second differential range described above can be split into two ranges, such as one from 3.5 to 4.25 inches and another from 4.25 to 5 inches, while the first and third differential ranges remain the same size.

The 1.5-inch differential ranges are for denim which is used in jeans. The size of each differential range also depends on the stretch of the fabric or material used for the pants. Generally, the greater stretch the material has, the larger the range can be since the material can stretch to accommodate larger shaped fit sizes. Material with less stretch may need smaller differential ranges, and therefore a greater number of categories.

In a specific implementation, denim includes cotton and spandex (or Lycra®). Spandex is a synthetic fiber that gives greater elasticity to the cotton material, especially compared to 100 percent cotton denim. A specific brand of spandex is Lycra®. Lycra fiber is a trademark of Invista.

A stretch denim typically has cotton and 2 percent spandex. Generally, the amount of spandex in denim varies from about 1 to 5 percent. However, depending on the amount of stretch desired, the amount of spandex in denim can be up to about 10 to about 15 percent. In certain circumstances (e.g., specialized wear), the denim can have even greater than 15 percent spandex.

Also, the particular weave used to weave the cotton and spandex together to make the denim will affect the stretch. With the weave and spandex, the denim material can have different stretch levels. In a specific implementation, the denim material is designed to stretch from about 15 to 35 percent. In this specific implementation, the determined differential ranges (e.g., 1.5-inch differential) and shaped fit sizing categories handle denim with a stretch from about 15 to 35 percent. However, depending on the weave and amount of spandex, the stretch can range extend from about 12 to 45 percent.

To facilitate the manufacture of pants with shaped fit sizing 135, fabric patterns 132 are created based on the determined shaped fit categories 130. The fabric patterns are patterns used for cutting of the material for the pants. Typically, there are about 10 to 15 patterns (which means there are 10 to 15 pieces of material) used for each shaped fit jean. After the pieces are cut based on the pattern, the pieces are sewn together. Additionally, rivets may be used to hold some pieces (e.g., pocket openings) together, which increases durability and strength. See U.S. Pat. No. 139,121, issued on May 20, 1873 to Levi Strauss & Co.

In a specific implementation, fabric patterns are generated by an engineer (who may be referred to as a "pattern engineer") with a computer aided design (CAD) tool. The engineer uses the tool to create individual pattern components (e.g., 10-15 individual pattern pieces). These pattern components are two-dimensional patterns. For example, Assyst GmbH, Autometrix, OptiTex, Bluewater Software, Gerber Scientific, Inc., and Quest CAD/CAM are manufacturers of apparel CAD software tools. With an apparel CAD tool, 2D fabric patterns are developed. The tool may also include a 3D visualization component the may used to show the design from a three-dimensional perspective.

To ensure the fit is good, pants can be manufactured according to the computer generated patterns. Then an actual person can try pants. Based on the results, the engineer can make further modifications to the computer patterns. This process can repeated as needed to ensure good fit and a proper look.

Separate patterns are created for each pair of jeans of a particular size and shape category. For example, there is a first pattern (with 10-15 individual pieces) for a size 27 jean in the slight curve category. There is a second pattern (with 10-15 individual pieces) for a size 27 jean in the demi curve category. There is a third pattern (with 10-15 individual pieces) for a size 27 jean in the bold curve category. Sizings may be from waist size 24 to 34, with different inseam sizes. Then there would be 33 patterns for 11 waist sizes in three shaped fit categories.

Jeans with the same waist size are made with different inseam measurements to accommodate people with longer or shorter legs. Jeans also are made with different boot cuts such as skinny, straight, skinny boot, boot cut, flare, and others. These are for styling and also to accommodate or accentuate the boots or other footwear the person is wearing. These may use different patterns. Since the inseam sizes and boot cuts do not necessarily affect the fit in the seat area (which is sometimes called the top block), some of the pattern pieces or potions or pattern pieces may be similar or the same as jeans with different inseam or boot cuts. The top block is a cut of the jean from the waistband through the hips and butt. Therefore, the top block can remain the same or about the same for some jeans, while the inseam and leg cuts will differ.

Figure 14:
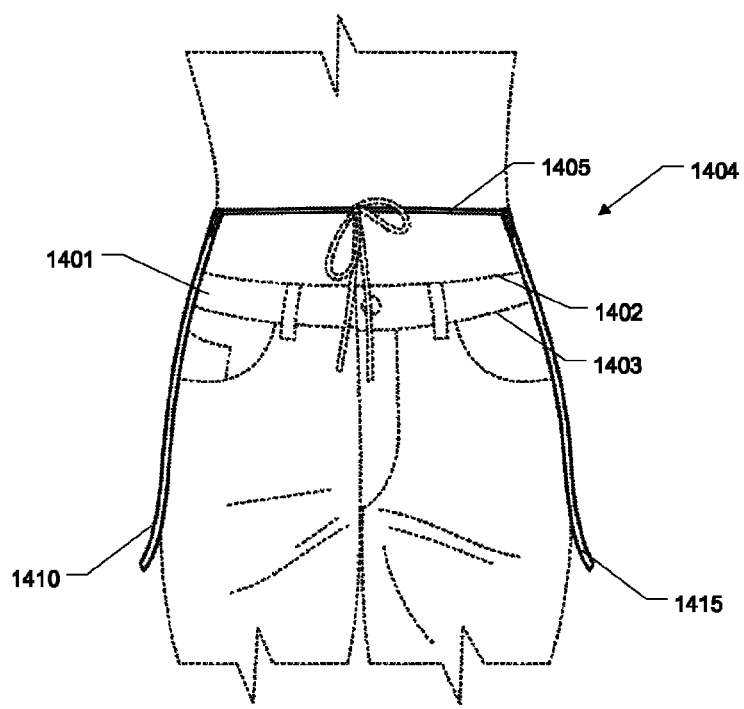
FIG. 14 shows a shape measuring tool when used to measure a person, as viewed from the front of the person.

The patterns for the pieces are designed to facilitate shaped fit sizing. So for a single size (e.g., size 27) of jeans in the three different shaped fits, the patterns will differ to achieve the desired shaped fit. One pattern piece for jeans is the waistband. For example, FIG. 14 shows a waistband 1401 of a pair of jeans. The waistband includes a waistband top 1402 and a waistband bottom 1403. In a specific implementation, a difference between waistbands for one shaped fit (e.g. slight) and a curvier shaped fit (e.g., bold) is that the two-dimensional (2D) waistband pattern is more arced or curved.

For example, for the slight curve (e.g., size 27), a waistband top is about 31 inches while a waistband bottom is about 31.75 inches, which is about a 0.75-inch difference. In comparison, for the bold curve (e.g., size 27), a waistband top is about 28 inches while a waistband bottom is about 29.5 inches, which is about a 1.5 inch difference. The greater this difference, the greater arc or curve in waistband pattern. This is a reason why the bold curve waistband pattern piece is more curved than slight curve waistband pattern piece.

Figure 7:
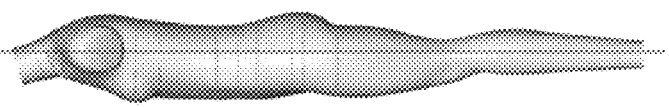
FIGS. 6-7 show a front and side profiles of a person having a body shape profile, who would fit into a first fit category A of pants (e.g., slight curve).
Figure 6:
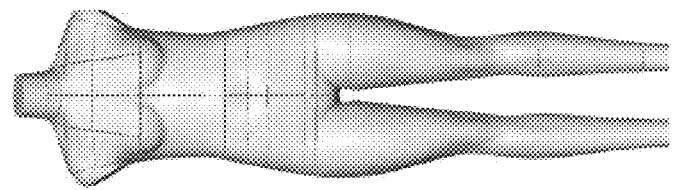

FIGS. 6-7 show a front and side profiles of a person having a body shape profile, who would fit into a first fit category A of pants (e.g., slight curve). This body type is associated with the first differential range, i.e., has a low hip-high hip differential that ranges from about 2 inches to about 3.5 inches (about 5.1 centimeters to about 8.9 centimeters). A person with this shape may be described as relatively straight with a flatter seat.

Figure 9:
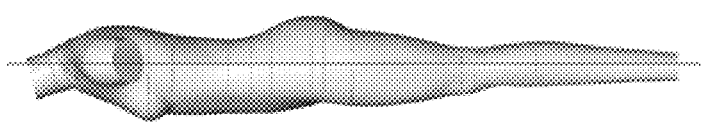
FIGS. 8-9 show a front and side profiles of a person having a body shape profile, who would fit into a second fit category B of pants (e.g., demi curve).
Figure 8:
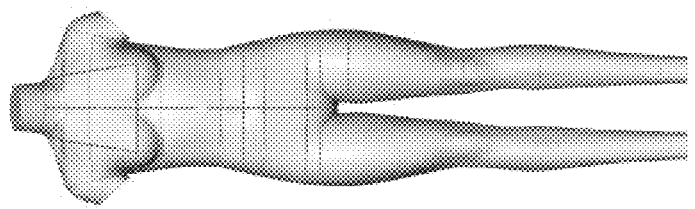

FIGS. 8-9 show a front and side profiles of a person having a body shape profile, who would fit into a second fit category B of pants (e.g., demi curve). This body type is associated with the second differential range, i.e., has a low hip-high hip differential that ranges from about 3.5 inches to about 5 inches (about 8.9 centimeters to about 12.7 centimeters). A person with this shape may be described as evenly proportioned. For example, in comparing FIGS. 7 and 9, the seat of the second body type (FIG. 9) is more curvy than the seat of the first body type (FIG. 7).

Figure 11:
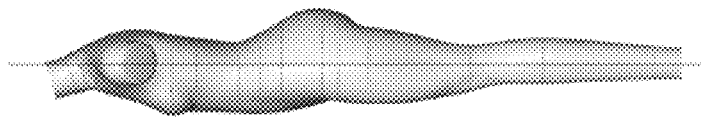
FIGS. 10-11 show a front and side profile of a person having a body shape profile with an hourglass figure, who would fit into a third fit category C of pants (e.g., bold curve).
Figure 10:
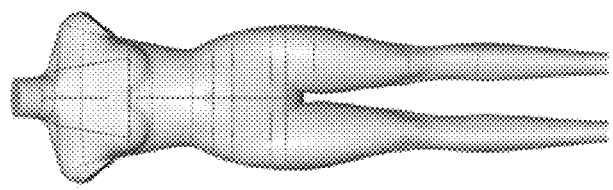
Figure 13:
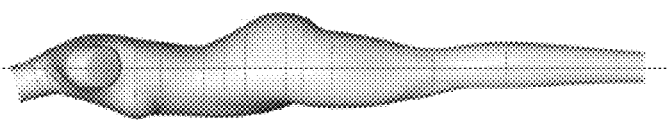
FIGS. 12-13 show a front and side profile of a person having a body shape profile with a full seat, who would also fit into the third fit category C of pants (e.g., bold curve).
Figure 12:
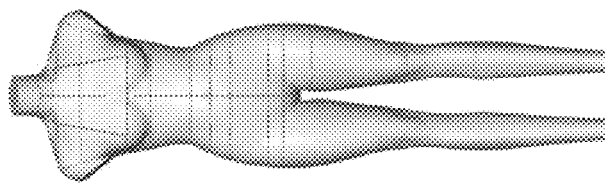

FIGS. 10-11 show a front and side profile of a person having a body shape profile with an hourglass figure, who would fit into a third fit category C of pants (e.g., bold curve). FIGS. 12-13 show a front and side profile of a person having a body shape profile with a full seat, who would also fit into the third fit category C of pants (e.g., bold curve). These two body types are wider in different directions. The hourglass figure is wider laterally (side to side), while the full seat is wider front to back.

Both shapes will fit into shaped fit category C pants. These body types are associated with the third differential range, i.e., has a low hip-high hip differential that ranges from about 5 inches to about 6.5 inches (about 12.7 centimeters to about 16.5 centimeters).

In another specific implementation, there is a fourth body type (not shown) that is associated with the fourth differential range, i.e., has a low hip-high hip differential that ranges from about 6.5 inches to about 8 inches (about 16.5 centimeters to about 20.3 centimeters). The fourth shaped fit category may be referred to as a supreme curve. The supreme curve is curvier than the bold curve.

The body types shown and described above can represent a combination (e.g., composite or an average) of multiple body types which may each have slightly different measurements.

Pants 135 having shaped fit sizing A, B, and C (and optionally D) that fit body types with body measurement differentials 117 as discussed above are designed and manufactured. For example, each shaped fit sizing will have a fabric pattern dimensions different from other jeans. A size 28 jean with a 30 inseam will have slight, demi, and bold versions. Each of the slight, demi, and bold versions will have different seat shaping, though the size may be the same.

For example, pants with the bold curve shape are curvier than the demi curve, which is curvier than the slight curve. This means that for a given size for the jeans, the demi has more shape from the hip to the seat area than the slight, and the bold has even more shape than the demi.

Figure 16:
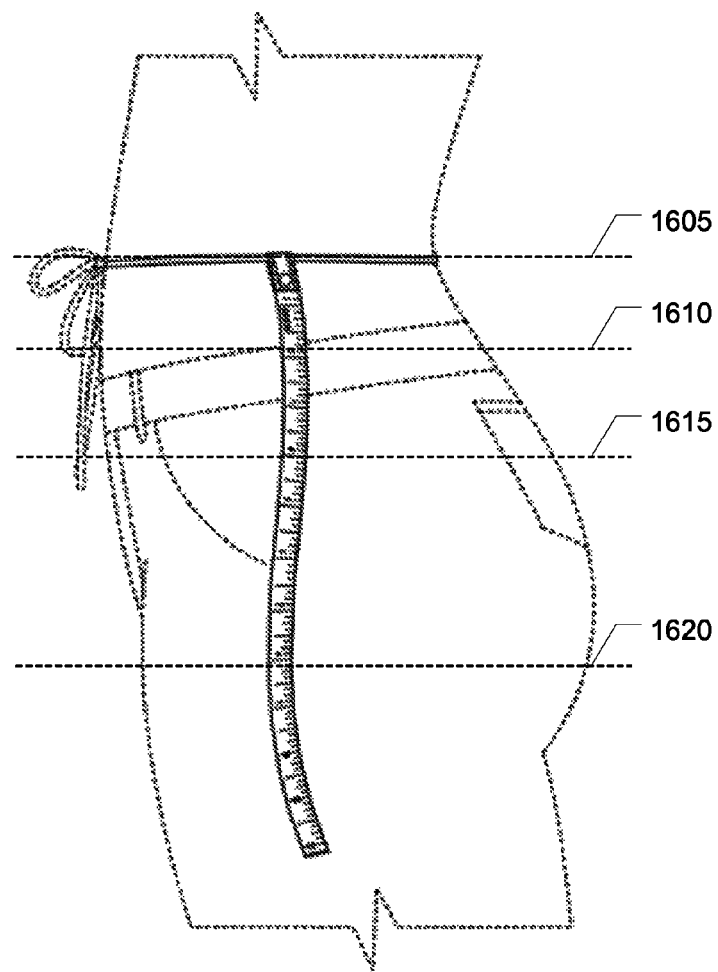
FIG. 16 shows the shape measuring tool of FIG. 14 when used to measure a person, as viewed from the side of the person.

For determination of the shaped fit sizing categories, referring to FIG. 16, the natural waist (1605) was used as a reference point on the body, instead of a point on the jeans (e.g., a top of the jeans 1610) as the reference point. The other measurements are in reference to the natural waist. The high hip (1615) is 4 inches below the natural waist, and the low hip (1620) or seat is 8 inches below the natural waist. The pants or apparel themselves do not have a natural waist reference point from which to make measurement unless they are being worn.

The top of the jeans is usually not worn at the natural waist, but some distance below the natural waist depending on the rise cut (e.g., low rise or mid rise). Typically low rise jeans are lower cut and the top of the jeans is a greater distance from the natural waist than mid rise jeans. So, for example, for a pair of a particular rise cut, the top of the jeans may be about 3 inches from the natural waist when worn. Then the low hip (LH) or seat measurement will be about 5 inches from the top of the jeans, which corresponds to 8 inches from the natural waist when the jeans are worn. The high hip (HH) will be about 1 inch from the top, which corresponds to 4 inches from the natural waist when the jeans are worn.

Therefore, the apparel measurements made on the jeans will differ from the body measurements by a difference between position of the top of the jeans (when worn) and the natural waist position. This difference amount will vary based on the rise cut. To find the high hip point on the apparel, this amount will be 4−X (e.g., between lines 1610 and 1615 in FIG. 16), where X is the distance between top of jeans 1610 and natural waist 1605 when worn. To find the low hip point on the apparel, this amount will be 8−X (e.g., between lines 1610 and 1620). According to the shaped fit sizing system of the invention, each size of the manufactured jeans has at least three different shaped fits (e.g., A, B, and C, or slight, demi, and bold). Each size may be indicated by a waist size number (e.g., 24-34) or other size number (e.g., 2-18). For example, size 27 is manufactured with three shaped fits—slight, demi, and bold.

In a specific implementation, for three different shaped fits of the same size, measurements of the "girth of the apparel" at the seat will be about the same. To make the "girth" measurement of the apparel, the apparel may be laid flat and a linear measurement at the seat can be made across the apparel from one side to an opposite side. The linear measurement can then be, for example, doubled to find the measurements of the apparel. For example, for size 27 jeans, the seat girth measurements for the slight, demi, and bold jean shapes will be about 36 inches at about 5 inches (as measured from a top of the jeans with top distance of 3 inches).

Although about the same, the seat measurements of the jeans can vary slightly depending on how the jeans will be worn and how the measurement is made. For example, the seat measurements for the different shapes will be about the same, varying from about 35¼ inches to about 36¼ inches, which is about a 1-inch range. In another implementation, the girth measurement at the seat of the different shapes will be about the same, varying in about a ¾-inch range.

By contrast, for jeans of the same size but different shaped fits, the girth measurements above the seat will be different. Generally, above the seat, the girth becomes smaller for each successively curvier shaped fit. For example, the least curvy shaped fit (e.g., slight curve) will have girth at a waist bottom which is greater than the next curvier shaped fit (e.g., demi curve), which will have a girth at its waist bottom which is greater than the next curvier shaped fit (e.g., bold curve).

The waist bottom is a girth measurement taken at about a bottom of a jeans waistband piece. The waist bottom girth measurement may approximately correspond to the high hip body measurement if it is about 1 inch from the top of the jeans that has a top distance of 3 inches. For example, in a specific implementation, the girth of the waist bottom for the slight curve is about 31¾ inches, demi curve is 31 inches, and bold curve is about 29½ inches. Note that the range difference for this girth measurement, above the waist, varies in a range of about 2 inches.

FIG. 2 shows a system for fitting a person to pants having shaped fit sizing. Jeans with shaped fit sizing are available to consumers or customers 205 through various channels. A channel for selling and making jeans available are stores. For example, Levi's Curve ID products are available at Levi retail stores (e.g., Union Square, San Francisco) or other retailers such as Macy's, J.C. Penny, and Kohl's (which may be referred to as wholesalers). A channel for selling and making jeans available on-line are Internet and Web sites.

A shape measuring tool 210 is used to fit the consumer. In a store, a salesperson can use the shape measurement tool to measure the consumer, and find which of the shaped fit sizing categories (e.g., A, B, or C) the consumer falls within. Two girth measurements 211 and 212 are made. A calculation 215 is made that indicates a shape index 217. With the shape index, the consumer will be able to determine their shaped fit pants classification or category 220. The consumer can choose the jeans 135 with the appropriate shaped fit sizing.

Table A below provides a specific example of a flow for making different measurements 210 and determining a shape index 215. It should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

TABLE A

| | |
|---|---|
| Step 1 | Make a first girth measurement 211 at a first position (e.g., high hip) of a person's body. |
| Step 2 | Make a second girth measurement 212 at a second position (e.g., seat or low hip) of person's body. |
| Step 3 | Subtract the first measurement from the second measurement to determine a shape index 217. |

For steps 1 and 2, the shape measuring tool used can include a measuring tape or tape measure. This measuring tape can a relatively narrow strip of flexible material with ruled markings in units such as inches (U.S. customary units) or centimeters (metric or SI). The measuring tape is flexible to conform to the person being measured and can be wrapped around a person's girth or circumference.

As discussed above, a reference point used for the measurements is the natural waist is the point at which the person can bend his or her body. The high hip position is located about 4 inches (about 10.2 centimeters) down from the person's natural waist. The low hip or seat is located about 4 inches down from the high hip, or about 8 inches down from the person's natural waist.

The measurements relative to the natural waist can be determined also by using a measuring tape (e.g., another measuring tape, separate from the girth measuring tape), which can lay along the person's body shape vertically (which is generally perpendicular or transverse to the girth measurements and girth measuring tape). First and second girth measurements are made at the high hip and the low hip positions.

For step 3, shape index 217 is a differential which is a result of subtracting first girth measurement 211 from second girth measurements 212. The value of the shape index (or differential) identifies the shaped fit category (A, B, or C) of pants for the user. The subtraction in step 3 can be done by the salesperson. Or the subtraction may be performed using a computer processor, such as in an electronic calculator or a computer (e.g., Web site performs calculation for on-line consumer). The shape index is relatively easy and straightforward to calculate.

For example, if the determined shape index is in a range from about 2 inches to about 3.5 inches (about 5.1 centimeters to about 8.9 centimeters), the shaped fit sizing will be the first fit category A (e.g., slight curve). If the determined shape index is in a range from about 3.5 inches to about 5 inches (about 8.9 centimeters to about 12.7 centimeters), the shaped fit sizing will be the second fit category B (e.g., demi curve). If the determined shape index is in a range from about 5 inches to about 6.5 inches (about 12.7 centimeters to about 16.5 centimeters), the shaped fit sizing will be the third fit category C (e.g., bold curve).

As an example, a person measures to have a high hip girth of 28 inches and a low hip girth of 34 inches. A difference between the high hip and low hip is 34 inches minus 28 inches, which is 6 inches. This corresponds to fit category C (e.g., bold curve).

These fit categories are for off-the-rack pants or jeans, which have been previously manufactured according to specifications for the shaped fit sizing categories. This is not custom tailoring because the person's measurements are made after the pants have already been made. The measurements are to perform a fitting of the person to the predetermined shaped fit categories or classifications.

As previously described, optionally, there can be a shaped fit category D (e.g., supreme curve), which is fit for a shape index or differential of about 6.5 inches and about 8 inches (about 16.5 centimeters to about 20.3 centimeters). Also, note that the range for shaped fit category A starts at 2. However, if the consumer were to measure under 2 inches (i.e., 0 to 3.5 inches), the consumer can be fitted to category A pants (e.g., slight curve).

In some cases, a person's shape index may be at the lower or upper limit of a range. For example, the person's shape index may be about 3.5 inches. In this specific implementation, the person may be provided with pants having shaped fit sizing A, pants having shaped fit sizing B, or both pairs of pants. As another example, the person's shape index may be about 5 inches. In this specific implementation, the person may be provided with pants having shaped fit sizing B, shaped fit sizing C, or both pairs of pants.

In alternate system implementations, the shape index may be the result of other mathematical computation, not merely a subtraction. For example, the calculation may include adding the two measurements. The calculation may include taking a ratio (division) of the two measurements. For example, a ratio of shape may be determined by dividing the second girth measurement by the first girth measurement.

The flow in table A can be described in a measurement guide (e.g., training guide or video) that is distributed to the salespeople at the retail stores. The measurement guide can be a written description of how to how to measure and fit a person to the appropriate shaped fit pants. For example, the measurement guide indicates that a first girth measurement is to be taken at a first position below a person's waist, and a second girth measurement is to be taken at a second position below the person's waist. The measurement guide can be part of the shape measuring tool kit. The measurement guide may be posted or otherwise displayed in the retail store for the salespeople or consumers to review. The measurement guide may be posted on a Web site for on-line consumers.

There can also be a shape index chart which lists the pants sizing for particular differentials, also distributed to the sales people at the retail stores. The shape index chart can be a written description listing the first, second, and third predetermined shaped sizing category for jeans (e.g., A, B, and C). The shape index chart also indicates the first and second girth measurements corresponding to the first predetermined shaped sizing category, second predetermined shaped sizing category, or third predetermined shaped sizing category. For example a difference between the first and second girth measurements of 2 to 3.5 will be shaped fit category A, 3.5 to 5 will be category B, and 5 to 6.5 will be category C. The shape index chart may be posted or otherwise displayed in the retail store for the salespeople or consumers to review. The shape index chart guide may be posted on a Web site for on-line consumers.

A sample shape index chart is in table B below. Once the shape index is know, the salesperson or consumer can look up the corresponding fit block or shaped fit sizing category.

TABLE B

| Shaped Fit Sizing (Fit Block) | Shape Index (Curve ID ®) |
|---|---|
| A (Slight Curve) | Up to 3½" |
| B (Demi Curve) | 3½" to 5" |
| C (Bold Curve) | 5" to 6½" |
| D (Supreme Curve) (optional) | 6½" to 8" |

This chart has a first section or row corresponding to the first predetermined shaped sizing category; a second section, adjacent to the first section, corresponding to the second predetermined shaped sizing category; and a third section, adjacent to the second section, corresponding to the third predetermined shaped sizing category. The second section is between the first and third section in the table; the corresponding shape index is numerically between the others. This index may be presented on multiple pages, and the second section is between the first and third section pages.

However, the chart presented in table B is relatively straightforward and easy to understand. Note that the ranges of the shape index overlap at specific measurements. For example, sizings A and B overlap at 3½ inches. However, as desired, the chart can also be written not to include such overlaps. For example, sizing A can be up to 3.49 inches, B from 3.5 to 4.99 inches, C from 5 to 6.49 inches, and so forth.

Figure 15:
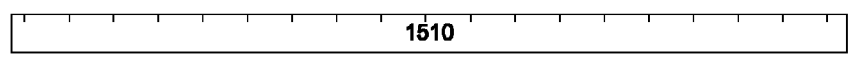
FIG. 15 shows a ruled measuring tape, which along with the shape measuring tool in FIGS. 14 and 16 forms a shape measuring tool kit.

FIGS. 14-16 show another implementation of a shape measuring tool. FIG. 14 shows a shape measuring tool 1404 when used to measure a person, as viewed from the front of the person. FIG. 15 shows a ruled measuring tape, which along with the shape measuring tool in FIGS. 14 and 16 forms a shape measuring tool kit. FIG. 16 shows the shape measuring tool of FIG. 14 when used to measure a person, as viewed from the side of the person. This shape measuring tool is further described in U.S. design patent application Ser. No. 29/376,345, filed Oct. 5, 2010, issued as U.S. Pat. No. D648,235 on Nov. 8, 2011, which is incorporated by reference.

This shape measuring tool includes a belt 1405, a first measuring tape 1410, a second measuring tape 1415, and a third measuring tape 1510 (FIG. 15). Ends of the first and second measuring tapes are attached to the belt.

Table C below provides a flow for using this shape measuring tool.

TABLE C

| | |
|---|---|
| Step 1 | Tie belt (e.g., string belt) around person's natural waist. |
| Step 2 | Position first and second measuring tapes attached to belt at the person's sides. |
| Step 3 | Wrap third measuring tape around person at a location about 4 inches below the natural waist as indicated by the first and second measuring tapes to measure person's high hip. |
| Step 4 | Wrap third measuring tape around person at location about 8 inches below the natural waist as indicated by the first and second measuring tapes to measure person's low hip. |
| Step 5 | Subtract the high hip measurement from the low hip measurement to obtain the shape index. |

In a step 1, the salesperson ties the belt around the person's natural waist. The natural waist may be found by instructing the person to fold their arms in front of their chest, stand evenly on both feet, keep their legs together, and bend sideways—the body typically bends at the natural waist.

In a step 2, the first and second measuring tapes attached to the belt are positioned at the person's sides. For example, FIG. 16 shows a view of the left side of the person where the second measuring tape has been positioned on the person's left side. The first measuring tape will be similarly positioned on the person's right side.

In a step 3, the person's high hip is measured using the third measuring tape. Typically, a person's high hip is located about 4 inches below the person's natural waist. The first and second measuring tapes can help the salesperson locate the person's high hip. Specifically, the salesperson can wrap the third measuring tape around the person at a location where the third measuring tape is aligned with the 4-inch marks on the first and second measuring tapes. Generally, the measurement should be made when the third measuring tape is level with the ground or parallel to the belt. The first and second measuring tapes can help to ensure that the third measuring tape is level. Specifically, when the third measuring tape is aligned with the 4-inch marks on the first and second measuring tapes, the third measuring tape will be level.

In a step 4, the person's low hip is measured. The procedure to measure the low hip is similar to the procedure for measuring the high hip as described in step 3 above. However, this measurement is made at a location about 8 inches below the person's natural waist because this is generally the location where the person's low hip is located. As in the high hip measurement, the first and second measurement tapes can help the salesperson locate the person's low hip and can help ensure that the third measurement tape is level when the low hip measurement is made.

In a step 5, the shape index is determined by subtracting the high hip measurement from the low hip measurement. In a specific implementation, the subtraction is performed by a computer such as via a calculator.

As was discussed for table A above, the flow in table C can be reflected in a measurement guide and shape index chart. The shape measuring tool kit can include the measurement guide and shape index chart.

Figure 17:
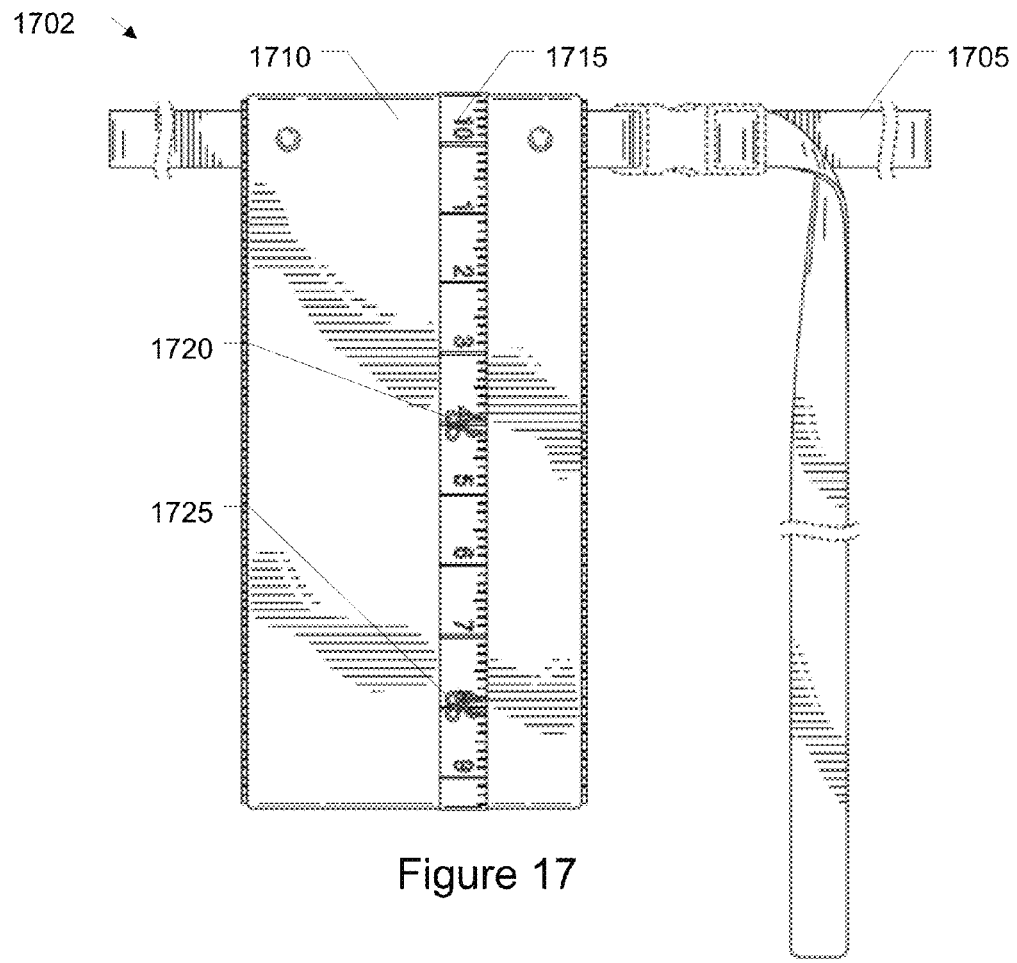
FIG. 17 shows another shape measuring tool, which has hooks at two specific locations where girth body measurements are to be taken.
Figure 18:
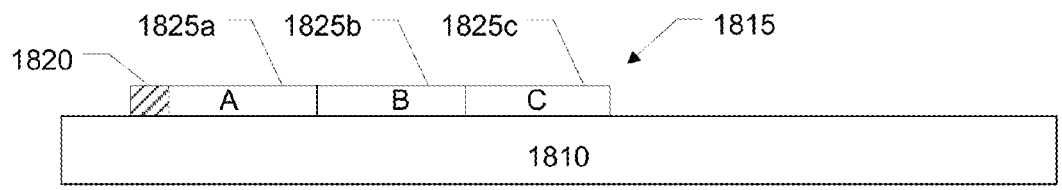
FIG. 18 shows a shape measuring tape, which along with shape measuring tool in FIG. 17 forms a shape measuring tool kit. A back of the shape measuring tape has an eye, which will attach to the hooks of the shape measuring tool to make measurements.
Figure 19:
FIG. 19 shows a indicator clip, which along with shape measuring tool in FIG. 17 and shape measuring tape of FIG. 18 form a shape measuring tool kit. The indicator clip will be clipped to the shape measuring tape and will indicate a shaped fit category.

FIGS. 17-19 show another implementation of shape measuring tool 1702. FIG. 17 shows another shape measuring tool, which has hooks at two specific locations where girth body measurements are to be taken. FIG. 18 shows a shape measuring tape, which along with shape measuring tool in FIG. 17 forms a shape measuring tool kit. A back of the shape measuring tape has an eye, which will attach to the hooks of the shape measuring tool to make measurements. FIG. 19 shows a indicator clip, which along with shape measuring tool in FIG. 17 and shape measuring tape of FIG. 18 form a shape measuring tool kit. The indicator clip will be clipped to the shape measuring tape and will indicate a shaped fit category. This shape measuring tool is further described in U.S. design patent application Ser. Nos. 29/376,486, and 29/376,488, filed Oct. 7, 2010, which are incorporated by reference.

This tool includes a belt 1705, an anchor panel 1710 attached to the belt and extending in a direction perpendicular or transverse relative to the belt, and a measuring tape 1715 (or ruled markings) attached to the anchor panel. The anchor panel further includes a top or upper hook 1720 and a bottom or lower hook 1725. The top hook is attached to the anchor panel at a distance about 4 inches (about 10.2 centimeters) from the belt. The bottom hook is attached to the anchor panel at a distance about 8 inches (about 20.3 centimeters) from the belt. These hooks of this tool serve as a measurement guide, indicating a first girth measurement being taken at a first position below a person's waist, and a second girth measurement being taken at a second position below the person's waist. The belt further includes a buckle so that the belt can be removably attached to the person to be measured.

This shape measuring tool further includes a tape 1810 (FIG. 18) and a clip 1910 (FIG. 19). The clip may be referred to as a calibration marker. The tape includes a back hook on a back side of the tape (not shown) and a shape index tab 1815 that includes a mark 1820 and shape index descriptors 1825a, 1825b, and 1825c.

In this specific implementation, there are three shape index descriptors, i.e., 1825a, 1825b, and 1825c. In another specific implementation, there are four index descriptors. Generally, the number of index descriptors is equal to the number of shaped fit categories available. The shape index descriptors correspond to the predetermined shaped fit sizing categories. The descriptors may be referred to as sections. Specifically, section 1825a corresponds to the first predetermined shaped sizing category. Section 1825b is adjacent to section 1825a and corresponds to the second predetermined shaped sizing category. Section 1825c is adjacent to section 1825b and corresponds to the third predetermined shape sizing category. Section 1825b is positioned between section 1825a and 1825c.

In this specific implementation, section 1825a, 1825b, and 1825c include printing indicative of the first, second, and third predetermined shaped sizing category (e.g., "slight," "demi," and "bold" wording). There are no numerical values corresponding to an arithmetic operation on the first and second girth measurements. In alternative implementations, the printing for each section can have different text or numbers.

Shape index descriptors 1825a, 1825b, and 1825c are a shape index chart for the first, second, and third predetermined shaped sizing category for jeans. This shape index chart indicates the first and second girth measurements corresponding to the first predetermined shaped sizing category, second predetermined shaped sizing category, or third predetermined shaped sizing category.

The back hook or eye allows the tape to be removably fastened to the top or bottom hook when using the tool to measure a person's shape. The back hook may be referred to as an eye, eyelet, grommet, fastener, or corresponding fastener.

Table D below provides a flow for using this shape measuring tool.

TABLE D

| | |
|---|---|
| Step 1 | Attach belt with anchor panel to the natural waist of person to be measured. |
| Step 2 | Attach back hook or eye on tape to lower hook 1725 on anchor panel (which corresponds to person's low hip or seat) and wrap tape around person's seat. |
| Step 3 | Locate mark on shape index tab, align clip with mark, and attach clip to the tape. |
| Step 4 | Attach back hook or eye on tape to upper hook 1720 on anchor panel (which corresponds to person's high hip) and wrap tape around person's high hip. Take care not to accidentally slide the clip attached to the tape. |
| Step 5 | Obtain shape index as indicated by the clip and shape index descriptors on the shape index tab of the tape. |

In a step 1, the salesperson attaches the belt with the anchor panel to the natural waist of a person to be measured. Once the belt is attached via the buckle, the belt is cinched or tightened so that it is snug around the natural waist and horizontal to the ground. In this specific implementation, the anchor panel should be positioned so that it is located on the right side of the person's body. However, the tool may be designed to be positioned on other sides of the person's body (e.g., left side of body).

In a step 2, the tape is held so that the shape index descriptors on the shape index tab are facing the salesperson. The salesperson finds the back hook or eye on the back side of the tape and hooks the back hook to the bottom hook on the anchor panel. The location of lower hook 1725 on the anchor panel is positioned so that it will correspond to the low hip when the belt is attached to the person's natural waist. While keeping the tape level, the tape is wrapped around the person's low hip or seat circumference.

In a step 3, the mark on the shape index tab is located. The salesperson aligns the clip with the mark and attaches the clip to the tape. In a specific implementation, the mark is a red colored mark at an end of the tab.

In a step 4, the back hook or eye on the tape is hooked to the top hook on the anchor panel. The location of upper hook 1720 on the anchor panel is positioned so that it will correspond to the high hip when the belt is attached to the person's natural waist. While keeping the tape level, the tape is wrapped around the person's high hip circumference. Care should be taken so that the clip is not accidentally slid or moved.

In a step 5, the shape index is obtained as indicated by the clip and shape index descriptors on the shape index tab of the tape. Specifically, where the clip lands on the tape's shape index tab is the person's shape index. For example, if the clip is aligned with or overlays shape index A on the tab the person's shape index is A. If the clip is aligned with shape index B on the tab the person's shape index is B, and so forth.

Thus, with this embodiment of the shape measuring tool, the salesperson does not have to subtract any measurements to obtain the person's shape index. Rather, the positioning and width of the shape index descriptors on the shape index tab are calibrated so that they can be used in conjunction with the technique described in table D above to obtain the person's shape index without the salesperson having to perform an arithmetical calculation such as a subtraction calculation. For example, with this tool, the salesperson will not have to perform any math in their head, write down the measurements on a piece of paper, or input the measurements into a calculator to obtain the person's shape index.

As was discussed for table A above, the flow in table D can be reflected in a measurement guide and shape index chart. The shape measuring tool kit can include the measurement guide and shape index chart.

The shaped sizing fit system for pants, jeans and shorts, of this invention gives consumers a choice for off-the-rack clothing that focuses on shape, not size. This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
a first sizing classification for pants, corresponding to fit for a first differential value between first and second body measurements in a first range, wherein the first body measurement is at a first position of a person, and the second body measurement is at a second position relative to the first position;
a second sizing classification for pants, corresponding to fit for a second differential value between first and second body measurements in a second range; and
a third sizing classification for pants, corresponding to fit for a third differential value between first and second body measurements in a third range,
wherein first pants of a given size in the first sizing classification has a first girth measurement at a first seat position at a first distance below a top of the pants and above a crotch of the pants,
second pants of the given size in the second sizing classification has a second girth measurement at the first seat position at the first distance below the top of the pants and above a crotch of the pants,
third pants of the given size in the third sizing classification has a third girth measurement at the first seat position at the first distance below the top of the pants and above a crotch of the pants, and
the first, second, and third girth measurements of the pants is about the same,
wherein first pants of the given size in the first sizing classification has a fourth girth measurement at a second position at a second distance below the top of the pants,
the second distance is less than the first distance,
third pants of the given size in the third sizing classification has a fifth girth measurement at the second position at the second distance below the top of the pants, and
the fourth girth measurement is greater than the fifth girth measurement.

2. The system of claim 1 wherein the second differential value of the second sizing classification for pants is greater than the first differential value of the first sizing classification for pants, and less than the third differential value of the third sizing classification for pants.

3. The system of claim 1 wherein for the first pants of a given size in the first sizing classification, the first girth measurement at the first seat position is greater than the fourth girth measurement at the second position, and
for the third pants of a given size in the third sizing classification, the third girth measurement at the first seat position is greater than the fifth girth measurement at the second position.

4. The system of claim 1 wherein for the first pants of a given size in the first sizing classification, a first inseam length is from the crotch of the pants to a bottom edge of the pants,
for the second pants of a given size in the second sizing classification, a second inseam length is from the crotch of the pants to a bottom edge of the pants, and
for the third pants of a given size in the third sizing classification, a third inseam length is from the crotch of the pants to a bottom edge of the pants.

5. The system of claim 1 wherein the first pants of a given size in the first sizing classification comprises a first waistband portion extending from a top edge of the pants to a bottom of the first waistband portion which is above the second position,
the second pants of a given size in the second sizing classification comprises a second waistband portion extending from a top edge of the pants to a bottom of the second waistband portion which is above the second position,
the third pants of a given size in the third sizing classification comprises a third waistband portion extending from a top edge of the pants to a bottom of the third waistband portion which is above the second position,
for the first pants of a given size in the first sizing classification, a first waistband differential comprises a difference between girths at the top edge of the first pants and at the bottom of the first waistband portion,
for the second pants of a given size in the second sizing classification, a second waistband differential comprises a difference between girths at the top edge of the second pants and at the bottom of the second waistband portion, and
the second waistband differential is greater than the first waistband differential.

6. The system of claim 5 wherein for the third pants of a given size in the third sizing classification, a third waistband differential comprises a difference between girths at a top edge of the third pants and at the bottom of the third waistband portion, and
the third waistband differential is greater than the second waistband differential.

7. The system of claim 1 wherein the first pants of a given size in the first sizing classification comprises a sixth girth measurement at a top edge of the pants,
the second pants of a given size in the second sizing classification comprises a seventh girth measurement at a top edge of the pants,
the third pants of a given size in the third sizing classification comprises an eighth girth measurement at a top edge of the pants,
the sixth girth measurement is a less than the seventh girth measurement, and
the seventh girth measurement is less than the eighth girth measurement.

8. The system of claim 1 wherein the first body measurement comprises a person's girth at a first position on a person's torso, the second body measurement comprises a person's girth at a second position on a person's torso, the second position is a first distance below the first position, and the person's girth at the second position is greater than the person's girth at the first position.

9. A system comprising:

a first sizing classification for pants, corresponding to fit for a first differential value between first and second body measurements in a first range, wherein the first body measurement is at a first position of a person, and the second body measurement is at a second position relative to the first position;

a second sizing classification for pants, corresponding to fit for a second differential value between first and second body measurements in a second range; and a third sizing classification for pants, corresponding to fit for a third differential value between first and second body measurements in a third range, wherein first pants of a given size in the first sizing classification has a first girth measurement at a top edge of the pants and a second girth measurement at a seat of the pants that is a first distance below the top edge of the pants, second pants of the given size in the second sizing classification has a third girth measurement at a top edge of the pants and a fourth girth measurement at a seat of the pants that is a first distance below the top edge of the pants, third pants of the given size in the third sizing classification has a fifth girth measurement at a top edge of the pants and a sixth girth measurement at a seat of the pants that is a first distance below the top edge of the pants, the fifth girth measurement is less than the third girth measurement, and the third girth measurement is less than the first girth measurement.

10. The system of claim 9 wherein the second, fourth, and sixth girth measurements of the pants is about the same.

11. The system of claim 9 wherein the first pants of a given size in the first sizing classification comprises a first waistband portion extending from the top edge of the pants to a bottom of the first waistband portion, the second pants of a given size in the second sizing classification comprises a second waistband portion extending from the top edge of the pants to a bottom of the second waistband portion, the third pants of a given size in the third sizing classification comprises a third waistband portion extending from the top edge of the pants to a bottom of the third waistband portion, for the first pants of a given size in the first sizing classification, a first waistband differential comprises a difference between girths at the top edge of the first pants and at the bottom of the first waistband portion, for the second pants of a given size in the second sizing classification, a second waistband differential comprises a difference between girths at the top edge of the second pants and at the bottom of the second waistband portion, and the second waistband differential is greater than the first waistband differential.

12. The system of claim 11 wherein for the third pants of a given size in the third sizing classification, a third waistband differential comprises a difference between girths at the top edge of the third pants and at the bottom of the third waistband portion, and the third waistband differential is greater than the second waistband differential.

13. The system of claim 9 wherein for the first pants of a given size in the first sizing classification, there is a first differential between first and second girth measurements, for the second pants of a given size in the second sizing classification, there is a second differential between third and fourth girth measurements, for the third pants of a given size in the third sizing classification, there is a third differential between fifth and sixth girth measurements, and the second differential is greater than the first differential.

14. The system of claim 13 wherein the third differential is greater than the second differential.

15. The system of claim 9 wherein the first distance is 8–X inches or less below the top edge of the pants, where X is a distance between the top edge of the pants to a person's natural waist when wearing the pants.

16. A system comprising:

a first sizing classification for pants, corresponding to fit for a first differential value between first and second body measurements in a first range, wherein the first body measurement is at a first position of a person, and the second body measurement is at a second position relative to the first position;

a second sizing classification for pants, corresponding to fit for a second differential value between first and second body measurements in a second range; and a third sizing classification for pants, corresponding to fit for a third differential value between first and second body measurements in a third range, wherein first pants of a given size in the first sizing classification comprises a first waistband, a first girth measurement at a top edge of the pants and a second girth measurement at of the pants at a bottom of the first waistband that is below the top edge of the pants, and a first waistband differential comprises a difference between girths at the top edge of the first pants and at the bottom of the first waistband portion, second pants of a given size in the second sizing classification comprises a second waistband, has a third girth measurement at a top edge of the pants and a fourth girth measurement at a bottom of the second waistband that is below the top edge of the pants, and a second waistband differential comprises a difference between girths at the top edge of the second pants and at the bottom of the second waistband portion, third pants of a given size in the third sizing classification comprises a third waistband, a fifth girth measurement at a top edge of the pants and a sixth girth measurement at a bottom of the third waistband that is below the top edge of the pants, and a third waistband differential comprises a difference between girths at the top edge of the third pants and at the bottom of the second waistband portion, the second waistband differential is greater than the first waistband differential.

17. The system of claim 16 wherein the third waistband differential is greater than the second waistband differential.

18. The system of claim 16 wherein the first pants of a given size in the first sizing classification comprises a seventh girth measurement at a seat of the pants that is a first distance below the top edge of the pants and above the crotch, the second pants of a given size in the second sizing classification comprises an eighth girth measurement at a seat of the pants that is a first distance below the top edge of the pants and above the crotch, the third pants of a given size in the third sizing classification comprises a ninth girth measurement at a seat of the pants that is a first distance below the top edge of the pants and above the crotch, the first distance is below the bottom of the waistband, and the seventh, eighth, and ninth girth measurements of the pants is about the same.

19. The system of claim 18 wherein the first distance is 8−X inches or less below the top edge of the pants, where X is a distance between the top edge of the pants to a person's natural waist when wearing the pants.

20. The system of claim 16 wherein the first girth measurement is less than the third girth measurement, and the third girth measurement is less than the fifth girth measurement.

21. A system comprising:

a first sizing classification for pants, corresponding to fit for a first differential value between first and second body measurements in a first range, wherein the first body measurement is at a first position of a person, and the second body measurement is at a second position relative to the first position;

a second sizing classification for pants, corresponding to fit for a second differential value between first and second body measurements in a second range; and a third sizing classification for pants, corresponding to fit for a third differential value between first and second body measurements in a third range, wherein first pants of a given size in the first sizing classification has a first girth measurement at a top edge of the pants and a second girth measurement at a seat of the pants that is a first distance below the top edge of the pants, second pants of the given size in the second sizing classification has a third girth measurement at a top edge of the pants and a fourth girth measurement at a seat of the pants that is a first distance below the top edge of the pants, third pants of the given size in the third sizing classification has a fifth girth measurement at a top edge of the pants and a sixth girth measurement at a seat of the pants that is a first distance below the top edge of the pants, the first girth measurement is less than the third girth measurement, and the third girth measurement is less than the fifth girth measurement.

22. The system of claim 21 wherein the first pants of the given size in the first sizing classification comprises a first waistband portion extending from the top edge of the pants to a bottom of the first waistband portion, the second pants of the given size in the second sizing classification comprises a second waistband portion extending from the top edge of the pants to a bottom of the second waistband portion, the third pants of the given size in the third sizing classification comprises a third waistband portion extending from the top edge of the pants to a bottom of the third waistband portion, for the first pants of the given size in the first sizing classification, a first waistband differential comprises a difference between girths at the top edge of the first pants and at the bottom of the first waistband portion, for the second pants of the given size in the second sizing classification, a second waistband differential comprises a difference between girths at the top edge of the second pants and at the bottom of the second waistband portion, and the second waistband differential is greater than the first waistband differential.

23. The system of claim 22 wherein for the third pants of the given size in the third sizing classification, a third waistband differential comprises a difference between girths at the top edge of the third pants and at the bottom of the third waistband portion, and the third waistband differential is greater than the second waistband differential.

24. The system of claim 21 wherein for the first pants of a given size in the first sizing classification, there is a first differential between first and second girth measurements, for the second pants of a given size in the second sizing classification, there is a second differential between third and fourth girth measurements, for the third pants of a given size in the third sizing classification, there is a third differential between fifth and sixth girth measurements, and the second differential is greater than the first differential.

25. The system of claim 24 wherein the third differential is greater than the second differential.

26. A system comprising:

a first sizing classification for pants, corresponding to fit for a first differential value between first and second body measurements in a first range, wherein the first body measurement is at a first position of a person, and the second body measurement is at a second position relative to the first position;

a second sizing classification for pants, corresponding to fit for a second differential value between first and second body measurements in a second range; and a third sizing classification for pants, corresponding to fit for a third differential value between first and second body measurements in a third range, wherein first pants of a given size in the first sizing classification has a first girth measurement at a top edge of the pants and a second girth measurement at a seat of the pants that is a first distance below the top edge of the pants, second pants of a given size in the second sizing classification has a third girth measurement at a top edge of the pants and a fourth girth measurement at a seat of the pants that is a first distance below the top edge of the pants, third pants of a given size in the third sizing classification has a fifth girth measurement at a top edge of the pants and a sixth girth measurement at a seat of the pants that is a first distance below the top edge of the pants, the first girth measurement is less than the third girth measurement, the third girth measurement is less than the fifth girth measurement, the first pants of a given size in the first sizing classification comprises a first waistband portion extending from the top edge of the pants to a bottom of the first waistband portion, the second pants of a given size in the second sizing classification comprises a second waistband portion extending from the top edge of the pants to a bottom of the second waistband portion, the third pants of a given size in the third sizing classification comprises a third waistband portion extending from the top edge of the pants to a bottom of the third waistband portion, for the first pants of a given size in the first sizing classification, the first waistband differential comprises a difference between girths at the top edge of the first pants and at the bottom of the first waistband portion, for the second pants of a given size in the second sizing classification, the second waistband differential comprises a difference between girths at the top edge of the second pants and at the bottom of the second waistband portion, and the second waistband differential is greater than the first waistband differential.

27. The system of claim 26 wherein for the third pants of a given size in the third sizing classification, a third waistband differential comprises a difference between girths at the top edge of the third pants and at the bottom of the third waistband portion, and the third waistband differential is greater than the second waistband differential.

\* \* \* \* \*